June 5, 1956  F. ROMAN  2,748,526
ANIMAL TRAP
Filed June 21, 1955
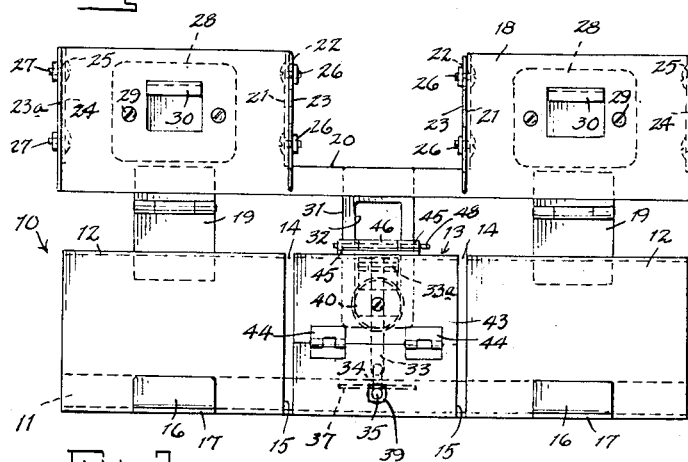
INVENTOR.
FRANK ROMAN
BY
ATTORNEY

United States Patent Office 2,748,526
Patented June 5, 1956

2,748,526

ANIMAL TRAP

Frank Roman, Bridgeport, Conn.

Application June 21, 1955, Serial No. 516,847

8 Claims. (Cl. 43—60)

The present invention relates to a trap for rodents, small animals, snakes and the like, and in particular to a trap of the type effective for either killing or catching alive these types of pests.

The principal object of the present invention is to provide such a trap having selective means thereon whereby the trap may be used either for killing these pests or catching them alive.

Another object is to provide a trap which is of simple, sturdy and inexpensive construction, and which may be quickly and easily converted from a trap intended to kill an animal to one which functions to catch and animal alive, and vice versa.

It is particularly proposed to provide a trap of generally tunnel-like form, having dead-fall animal killing means substantially spaced from the tunnel ends and having dead-fall closure means at each end, either the killing means or the closure means being adapted to be used alone, or both said means adapted to be used together.

Other objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a front view of the trap in the open or set position;

Fig. 2 is an end view of the trap in the set position, showing in dot-and-dash lines a hingedly mounted door at the center thereof, in its open position;

Fig. 3 is a top view of the trap in the set position;

Fig. 4 is a fragmentary rear view of the center section of the trap in the set position;

Fig. 5 is a front view of the trap in the closed position;

Fig. 6 is an end view of the trap in the closed position, as seen from the left hand end of Fig. 5;

Fig. 7 is a sectional view on the line 7—7 of Fig. 5; and

Fig. 8 is a fragmentary front view of a modified form of the invention, showing one end section of the trap having spring means for forcibly closing the trap.

The trap, according to the illustrated exemplary embodiment of the invention, comprises a tunnel-like housing 10 including a longitudinal base portion formed of a channel member 11 having upstanding parallel forward and rearward longitudinal side flanges. The said tunnel-like housing is divided into three sections, two identical end sections 12—12 and a center section 13. The said end sections 12 are formed of inverted U-shaped channel members having a horizontal top wall portion and vertical side wall portions, which are joined as by a weld or the like to the upturned flanges of the common base channel member 11. The adjacent edges of these sections are longitudinally separated to form slots 14 which are adapted to receive animal engaging blades, as will hereinafter more fully appear. The upwardly turned forward flange of the channel member 11 is cut out at 15—15 so that the slots 14 at the forward side extend down to the base portion of the channel member 11.

Secured as by a weld or other suitable means at oppositely spaced points on the forward and rearward surfaces of the end sections 12 of the housing, are L-shaped leg members 16, the foot portions 17 of which are in the same plane as the horizontal base portion of channel member 11. These lend added stability to the housing, rendering it more difficult to overturn, and also provide portions for staking the trap to the ground or securing it upon a plank or the like.

A blade supporting plate 18 of substantially the same length and width as the housing 10, is hingedly mounted by hinges 19 at the upper rearward edge of the housing. The lower element of each of the said hinges is secured as by a weld to the housing, and the upper element is secured as by a weld to the blade supporting plate. On these hinges 19 the blade supporting plate is swung upwardly to be set and downwardly when released.

Extending rearwardly from the forward edge of the blade supporting plate member and centrally thereof, is a rectangular cutout 20, the transverse edges of which, when the said plate overlies the housing as in the closed position, are adapted to be in vertical alignment with the blade receiving slots 14 which separate the end section 12 from the center section 13. Upwardly turned flanges 21 extend along the transverse edges of the cutout 20, and are provided with bolt receiving holes 22 to cooperate with suitable bolts and nuts 26 for securing and detaching blades 23 which, when the trap is closed, extend through the slots 14 and into the housing at either side of the center section 13 thereof.

Similar upturned flanges 24 extend along the transverse ends of the hingedly mounted plate member, so that the outside surfaces of said flanges are in vertical alignment with the ends of the housing. These flanges have bolt receiving holes 25 therein to provide for the attachment and detachment of blades 23a by suitable bolts and nuts 27.

As shown in Figs. 1–7, weights 28 are secured as by screws 29 to the upper surface of the hingedly mounted plate 18, and, as will hereinafter more fully appear, these function to forcibly close the trap when the plate has been released. In order to prevent the blade members from forcibly jamming against the base of the channel member 11, downwardly projecting stop members 30 having right-angularly bent foot portions are struck from the plate 18 beneath the weights.

As shown in Figs. 1–4, the blade supporting plate is in the raised or set position and is releasably retained in such position by a bail member 31, preferably formed of a rectangular piece of sheet metal, having a large rectangular opening 32 therein. One transverse end portion of the member 31 is rigidly secured as by a weld to the upper surface of the central portion of the blade supporting plate 18 and its opposite transverse end portion is engaged beneath an arm 33 pivotally connected by a hinge 33a upon the rear wall portion of the center section 13 of the tunnel-like body. The hinged arm is held in retaining position by the hooked or bent end 34 of a transverse horizontal tilt rod 35 which is pivotally mounted in bearing openings 36 in the lower side walls of the center section 13. A tilting platform 37 is rigidly secured centrally upon the rod so that as an animal touches the plate it tilts, tilting the end 34 which releases the arm 32 which, in turn, releases the member 31 and allows the plate 18 to drop downwardly under the force of the weights 28. The tilt rod is held against axial movement by a collar 38 secured thereon adjacent the hook end 34 and by a nut 39 secured upon its forward end.

A perforated bait box or cup 40 is removably mounted on the inner side of the forward wall of the center section 13 above the tilting platform 37 by means of a bolt 41 and nut 42, the bolt extending through the forward wall of the center section and through the base of the cup, and the nut being engaged with the inner side of the cup. By so positioning the bait cup, it is assured that an animal in quest of the bait therein will tilt the platform 37 which in turn releases the trap from the set position enabling it to be forcibly closed.

To enable an operator to get at the bait retaining cup and also to see clearly down inside the housing, the upper front wall portion and the forward top wall portion of the center section are in the form of a separate door 43 which is connected by hinges 44—44 to the upper edge of the lower front wall portion. As shown in dot-and-dash lines in Fig. 2, when the door is swung outwardly the bait cup is easily accessible as well as the view of the interior of the housing.

A pair of pin receiving loop members 45—45 are mounted on the upper surface of the door-like member and are adapted, when the door is closed, to be engaged in axial alignment at each side of a similar loop 46 mounted upon the rearward stationary portion 47 of the top wall of the center section 13. When so aligned a pin 48 is slid through the loops, securely locking the door in closed position.

When it is desirable that the trap be employed to kill a pest, the blade members 23 are attached to the flanges 21 adjacent the parallel edges of the U-shaped recess in the hingedly mounted plate member 18. When the tilting platform is then engaged by an animal to turn the tilt rod and release the raised plate with the blades thereon, these blades will engage the animal and kill him. Should it be desirable to catch the animal alive, these blades may be moved to the end of the plate and mounted on the flanges 24. When the hingedly mounted plate drops downwardly with the blades so mounted, the open ends of the tunnel are closed trapping the animal alive within. Preferably a double set of blades is employed, i. e., killing blades 23 at each end of the center section and end closing blades 23a at the outer ends of the end sections.

The blade members 23 may be sharpened to a fine edge to increase their effectiveness for killing, or they may be provided with teeth 49 as shown in Figs. 2 and 7, or otherwise suitably formed. When the trap is to be used for capturing animals alive, however, blades without sharpened or cutting edges are used.

By employing a double set of blades, an operator is assured that an animal who has released the trap will not escape, for should the blade members at the central portion of the trap fail to engage the said animal, those at the end of the housing would prevent its retreat from the housing. Furthermore, such an arrangement is adapted to be effective when different animals approach the bait from opposite ends of the trap, or from a common end, but are spaced with respect to their distance to the blade members at the center portion of the trap. In such a situation one would be killed and another trapped alive.

The traps may be of various sizes, depending upon the type of animal sought to be trapped therein, and may be of sheet steel or similar material. In addition, it should be noted that the housing may be an integral cast piece, though herein described as being formed of U-shaped channel members welded together.

In Fig. 7 there is illustrated a modification in which spring means are employed in place of the weights 28. Each hinge member 19a has a tensioned helical spring 50 engaged about its pintle 51, one end of the spring being engaged with the outer side of the upper leaf of the hinge, and the other end being engaged with the outer side of the lower leaf, thus normally urging the blade supporting plate 18 to its closed position.

What is claimed is:

1. An animal trap comprising a longitudinal tunnel-like housing having a pair of longitudinally spaced blade receiving slots spaced from the ends of said housing, blade supporting means movably mounted at the upper side of said housing for movement between an open set position and a closed actuated position, blade attaching means carried by said supporting means substantially aligned with said slots and with the ends of said housing, means for setting said supporting means in open set position including releasable retaining means engageable with said supporting means, and movable catch means engageable with said releasable means and including an animal engaging part within said housing adapted upon being engaged by the animal to move said catch means to release said releasable means, means loading said supporting means to move it to closed position upon release by said releasable means, and blade means adapted to be removably secured selectively to said blade attaching means in line with said slots or to said blade attaching means in line with the ends of said housing, said blade means adapted in the open position of said supporting means to be clear of the passage through said housing and adapted in the closed position to be engaged across said passage at a point intermediate said slots.

2. The invention as defined in claim 1, further characterized in that said blade supporting means is hingedly mounted for swinging movement about a longitudinal axis substantially in line with one longitudinal edge of the upper side of said housing.

3. The invention as defined in claim 1, further characterized by said animal engaging part being disposed within said housing at a point intermediate said pair of longitudinally spaced slots.

4. The invention as defined in claim 1, further characterized in that the housing part between said slots includes a movable door member movable between open and closed position and adapted in the open position to give access to the interior of said housing part.

5. The invention as defined in claim 1, further characterized in that the housing part between said slots includes a movable door member movable between open and closed position and adapted in the open position to give access to the interior of said housing part, and latch means for securing said door in closed position.

6. The invention as defined in claim 1, further characterized in that the housing part between said slots includes a movable door member movable between open and closed position and adapted in the open position to give access to the interior of said housing part, and a bait receiving cup member carried upon the rear side of said door.

7. The invention as defined in claim 1, further characterized in that said means loading said supporting means comprises weight means.

8. The invention as defined in claim 1, further characterized in that said means loading said supporting means comprises spring means.

References Cited in the file of this patent
UNITED STATES PATENTS
2,478,286    Lanza _____ Aug. 9, 1949